United States Patent
Hinkel et al.

(10) Patent No.: US 9,646,365 B1
(45) Date of Patent: May 9, 2017

(54) VARIABLE TEMPORAL APERTURE

(71) Applicant: Amazon Technologies, Inc., Reno, NV (US)

(72) Inventors: Bradley Lawrence Hinkel, Kirkland, WA (US); William Nathan John Hurst, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 221 days.

(21) Appl. No.: 14/458,118

(22) Filed: Aug. 12, 2014

(51) Int. Cl.
*G06T 5/00* (2006.01)
*H04N 5/232* (2006.01)

(52) U.S. Cl.
CPC ......... *G06T 5/003* (2013.01); *H04N 5/23245* (2013.01); *G06T 2207/10004* (2013.01); *G06T 2207/10144* (2013.01); *G06T 2207/20201* (2013.01)

(58) Field of Classification Search
CPC  G02B 13/0065; G02B 17/08; G02B 17/0856; G02B 23/02; G02B 23/06; G06T 5/003; G06T 2207/10004; G06T 2207/10144; G06T 2207/20201; H04N 5/23254
See application file for complete search history.

(56) References Cited

U.S. PATENT DOCUMENTS

| | | | |
|---|---|---|---|
| 6,856,355 B1 * | 2/2005 | Ray | G01S 17/89 348/370 |
| 2002/0027600 A1 | 3/2002 | Yamanaka et al. | |
| 2002/0159167 A1 | 10/2002 | Greenberg | |
| 2003/0063529 A1 * | 4/2003 | Iwata | G11B 7/1353 369/44.23 |
| 2004/0201771 A1 * | 10/2004 | Itoh | H04N 5/2352 348/363 |
| 2004/0263652 A1 * | 12/2004 | Oda | H04N 9/045 348/272 |
| 2005/0212940 A1 * | 9/2005 | Kobayashi | H04N 9/045 348/316 |
| 2008/0013941 A1 | 1/2008 | Daley | |
| 2008/0029714 A1 | 2/2008 | Olsen et al. | |
| 2008/0226844 A1 * | 9/2008 | Shemo | G02B 5/3016 428/1.1 |

(Continued)

FOREIGN PATENT DOCUMENTS

JP          10012524 A  *  1/1998

OTHER PUBLICATIONS

Akoi et al. ("Measurement and description method for image stabilization performance of digital cameras," Proc. SPIE 8659, Sensors, Cameras, and Systems for Industrial and Scientific Applications XIV, Feb. 19, 2013).*

(Continued)

*Primary Examiner* — Yubin Hung
(74) *Attorney, Agent, or Firm* — Davis Wright Tremaine LLP

(57) ABSTRACT

An system having an aperture configured to change state while recording one or more images during an image capture process, and a method for processing one or more recorded images by detecting at least a bokeh artifact within the one or more images and processing the images based at least in part on information obtained by analyzing the size and orientation of the bokeh artifact.

21 Claims, 12 Drawing Sheets

(56) References Cited

U.S. PATENT DOCUMENTS

| | | | |
|---|---|---|---|
| 2008/0239316 A1* | 10/2008 | Gharib | G01B 11/24 356/364 |
| 2008/0316354 A1 | 12/2008 | Nilehn et al. | |
| 2009/0016642 A1* | 1/2009 | Hart | G06T 7/0057 382/278 |
| 2009/0219402 A1* | 9/2009 | Schneider | G03B 17/00 348/208.7 |
| 2010/0128137 A1 | 5/2010 | Guidash | |
| 2010/0201865 A1 | 8/2010 | Han et al. | |
| 2010/0245602 A1* | 9/2010 | Webster | H04N 5/211 348/208.4 |
| 2011/0085074 A1 | 4/2011 | Sonoda et al. | |
| 2011/0122287 A1* | 5/2011 | Kunishige | H04N 1/00114 348/229.1 |
| 2011/0128412 A1* | 6/2011 | Milnes | G02B 27/22 348/231.99 |
| 2011/0149129 A1 | 6/2011 | Kim et al. | |
| 2012/0105690 A1 | 5/2012 | Waqas et al. | |
| 2012/0236164 A1 | 9/2012 | Nakano | |
| 2012/0249830 A1 | 10/2012 | Tsubaki | |
| 2012/0274775 A1* | 11/2012 | Reiffel | G06Q 30/08 348/158 |
| 2013/0038767 A1 | 2/2013 | Kawamura et al. | |
| 2013/0057714 A1 | 3/2013 | Ishii et al. | |
| 2013/0222633 A1 | 8/2013 | Knight et al. | |
| 2013/0266210 A1 | 10/2013 | Morgan-Mar et al. | |
| 2013/0272625 A1* | 10/2013 | Cheng | G06K 9/40 382/264 |
| 2014/0022359 A1 | 1/2014 | Misawa et al. | |
| 2014/0063234 A1* | 3/2014 | Nobayashi | H04N 7/18 348/135 |
| 2014/0139705 A1 | 5/2014 | Ebe | |
| 2014/0176780 A1 | 6/2014 | Koshiba | |
| 2014/0218550 A1* | 8/2014 | Chuang | H04N 5/23229 348/208.6 |
| 2014/0247981 A1* | 9/2014 | Kusaka | H04N 5/3572 382/165 |
| 2015/0043783 A1 | 2/2015 | Ishihara | |
| 2015/0104074 A1 | 4/2015 | Vondran et al. | |
| 2015/0117496 A1* | 4/2015 | Johansson | H04B 1/7097 375/146 |
| 2015/0138379 A1* | 5/2015 | Auberger | H04N 5/23254 348/208.1 |
| 2015/0170400 A1* | 6/2015 | Seitz | G06T 15/08 345/427 |

OTHER PUBLICATIONS

MathWorks, "Deblurring Images Using the Blind Deconvolution Algorithm—MATLAB & Simulink Example," 1994-2015 The MathWorks, Inc., retrieved Apr. 9, 2014, from http://www.mathworks.com/help/images/examples/deblurring-images-using-the-blind-deconvolution-algorithm.html, 7 pages.

Joshi et al., "Image Deblurring using Inertial Measurement Sensors," ACM SIGGRAPH Conference Proceedings, Jul. 2010, 8 pages.

Har-Noy et al., "LCD motion blur reduction: a signal processing approach," IEEE Transactions on Image Processing, National Center for Biotechnology Information, Feb. 2008, 17(2), 1 page.

* cited by examiner

VARIABLE TEMPORAL APERTURE

BACKGROUND

Modern cameras create an image during a period of exposure when the camera shutter is open to permit light to enter through the lens. However, motion of the camera or motion of objects within the scene during the exposure period may result in images with undesirable blurring. Motion blur may be caused by any combination of directions and rotations of the camera and/or objects within the scene during the exposure, and the blurring within the scene may vary depending on the distance from the center of the frame. Because modern cameras generally provide a roughly constant aperture, not only is the motion during the exposure often indeterminate but the details of the motion cannot be easily extracted from the resulting image. Mitigating motion blur is made more difficult thereby without information about the directions of motion and velocities of the objects in motion within the scene.

BRIEF DESCRIPTION OF THE DRAWINGS

Various embodiments in accordance with the present disclosure will be described with reference to the drawings, in which.

DETAILED DESCRIPTION

Figure 1:
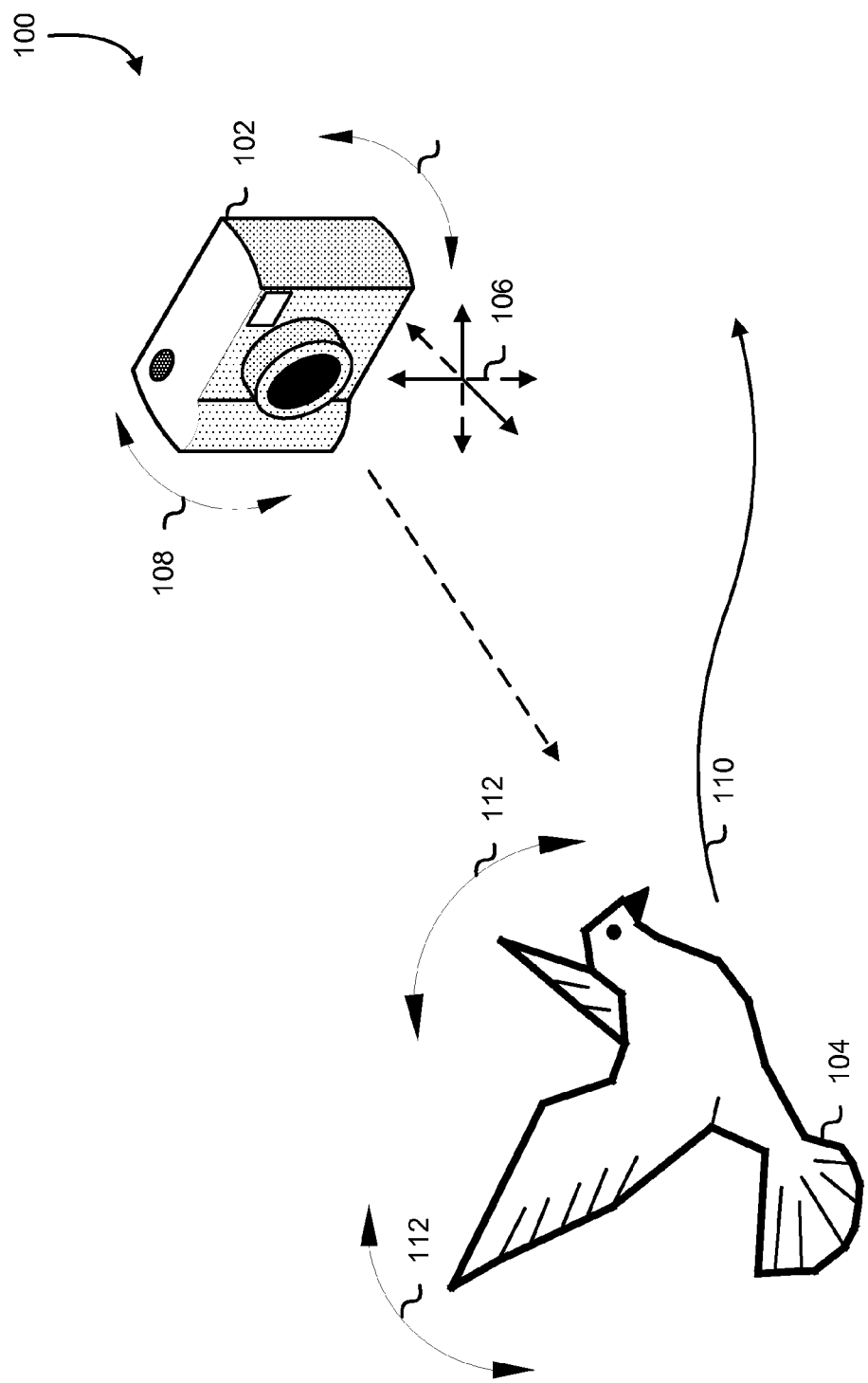
FIG. 1 illustrates various motions that may cause motion blur during an image capture event.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested include changing an aperture of an image capture device to determine directions of motion and objects in motion during an exposure of an image. In various embodiments, deblurring algorithms are performed to provide some clarity to images with blurring. In some embodiments, deblurring involves deconvolution, which is the process of reducing optical distortion and sharpening blurred images. A technique of blind deconvolution may be performed to provide some clarity to images with blurring if no information is known about cause of the blurring. Further clarity may be achieved when deblurring algorithms are combined with knowledge about the image at the time of capture, such as the motion of the image capture device or motion of objects within the scene during the period of the exposure. Motion of the image capture device may be determined by motion detection incorporated within the image capture device. Examples of motion detection include, but are not limited to, inertial measurement sensors and comparing differences between successive image captures.

Further clarity may be achieved if information is known about objects in motion within the scene at the time of exposure. Camera apertures generally have a nearly round shape; however an aperture may be of nearly any shape. The shape of the aperture affects the shape of the blurring within the captured image, producing artifacts within the image in the shape of the aperture, referred to as bokeh artifacts. For example, bokeh artifacts produced in an image captured by an image capture device with a round aperture appear round, whereas bokeh artifacts produced in an image captured by an image capture device with an aperture in the shape of a cross will appear in the shape of a cross. By using an aperture of an identifiable shape, blurred regions may be identified by detecting occurrences of bokeh artifacts with the aperture shape within the captured image. When an object is otherwise within the focus area, occurrences of bokeh artifacts with the aperture shape at the object indicates that the object is in motion and blurring has occurred.

Thus, by changing the aperture in a particular manner during the exposure, the blur may be transformed into a predictable shape. The predictable shape may then be isolated and used to calculate the direction of motion and details of objects that were in motion during the exposure. Once the directions of motion and the objects that were in motion are known, the blur may be removed and the image sharpened thereby. For example, information about the motion, such as direction, velocity, and acceleration may be determined by first detecting occurrences of bokeh artifacts with the initial aperture shape within the captured image, changing the aperture of the image capture device during an exposure or between exposures, detecting occurrences of bokeh artifacts with the changed aperture shape within the same or subsequent captured image, and analyzing differences between the bokeh artifacts with the initial aperture shape and the bokeh artifacts with the changed aperture shape. Occurrences of the bokeh artifacts with the changed aperture shape should have corresponding occurrences of bokeh artifacts with the initial aperture shape from earlier in the exposure or an earlier exposure, and differences, such as a change in position, size, or brightness of the bokeh artifacts may provide information about the direction, velocity, and acceleration of the object and/or motion of the camera. However, by changing the aperture in a particular manner during the exposure, the blur may be transformed into a predictable shape. The predictable shape may then be isolated and used to calculate the direction of motion and details of objects that were in motion during the exposure.

Once the directions of motion and the objects that were in motion are known, the blur may be removed and the image sharpened thereby.

Based on information determined by comparing the occurrences of identifiable aperture shapes within the captured image, further clarity may be achieved with deblurring algorithms. In an embodiment, the image capture device performs deconvolution processing on the captured image based on information determined by comparing the occurrences of bokeh artifacts with identifiable aperture shapes within the captured image. In another embodiment, the image capture device performs deconvolution processing on the captured image based on information received from motion detection integrated within the image capture device before performing deconvolution processing on the captured image based on information determined by comparing the occurrences of bokeh artifacts with identifiable aperture shapes within the captured image.

FIG. 1 illustrates an aspect of an environment 100 in which an embodiment of the present disclosure may be practiced. The environment 100 illustrates the various motions that may cause motion blur in an image during an image capture event. The environment 100 includes a user device 102, which may be any type of consumer electronics device with image capture capability, including, but not limited to, still cameras and movie cameras that capture images from light. The device may comprise a lens and an external housing enclosing a recorder component for capturing the images from light, such as film or analog or digital electronic means, such as image sensors. Such devices may include, but are not limited to, a video camera, a digital camera, a cellular phone camera, a film camera, a laptop or desktop computer, a tablet, a mobile phone or a smartphone, a smart television. Such devices may further comprise internal memory, examples of which include, but are not limited to, random access memory, flash recording media, and magnetic recording media. Such devices may further be under the control of a processor, such as, but not limited to, a central processing unit, graphics processing unit, or microcontroller. The user device 102 may be configured to communicate using any type of communication protocol including a cellular wireless communications protocol, such as fourth generation (4G) communications or long term evolution (LTE™), a wireless local area network (WLAN) communications protocol, such as an Institute for Electrical and Electronics Engineers (IEEE) 802.11, 802.16 or 802.21 communication protocol, or short range communications protocol, among others.

The user device 102 may be equipped with a processor, such as a central processing unit (CPU) or a graphics processing unit (GPU) that provides computing functionality to a user. Examples of a CPU include those utilizing a complex instruction set computing (CISC) architecture, such as the x86 CPU, and others that utilize a reduced instruction set computing (RISC) architecture, such as the advanced RISC machine (ARM) CPU. The user device 102 may also be equipped with one or more input peripherals, such as a touch screen that responds to a fingertip or a stylus input, a physical keyboard, a digital camera, a microphone, a touchpad or a mouse, among others. Furthermore, the user device 102 may be configured with one or more applications that facilitate receiving voice inputs or voice commands from a user via the microphone or image inputs via a digital camera. In addition, the user device 102 may also be equipped with one or more output peripherals such as a screen or speakers, whereby if the user device 102 is equipped with a touch screen, the touch screen may service as both an input and an output peripheral device. The user device 102 may further be equipped with a global positioning system (GPS) circuitry that enables locating the device. The user device 102 may further be equipped with an operating system and may be configured to execute software applications and programs compatible with the operating systems.

The user device 102, as illustrated in FIG. 1 may attempt to capture an image of a scene that includes an object in motion, such as an object 104. The user device 102 may be in motion in a linear direction in an orthogonal coordinate system 106 and/or may further be submitted to rotational motion 108. Further, objects in the scene, such as object 104, may be in motion, traversing a linear or non-linear path 110, such as a flight path, and may be further associated with one or more other motions 112 of various velocities, such as flapping wings. Any or all of these motions may cause motion blur in an image captured by user device 102.

In some image capture devices, the shutter is comprised of a plurality of blades that slide over each other in such a way as to define the size and shape of the aperture. Other image capture devices, such as an image sensor in a cellular phone, may not have a physical shutter, and the recording of the light may be controlled by a charge-coupled device (CCD), complementary metal-oxide-semiconductor (CMOS) technology, or N-type metal-oxide-semiconductor (NMOS) technology. An exposure is the amount of light per unit area that reaches the film or image sensor. Image capture devices may include, but are not limited to, still cameras and movie cameras that capture images from light using film or from light using analog or digital electronic means, such as image sensors. Examples of such devices may include, but are not limited to, video cameras, digital cameras, cellular phone cameras, and film cameras.

Figure 2:
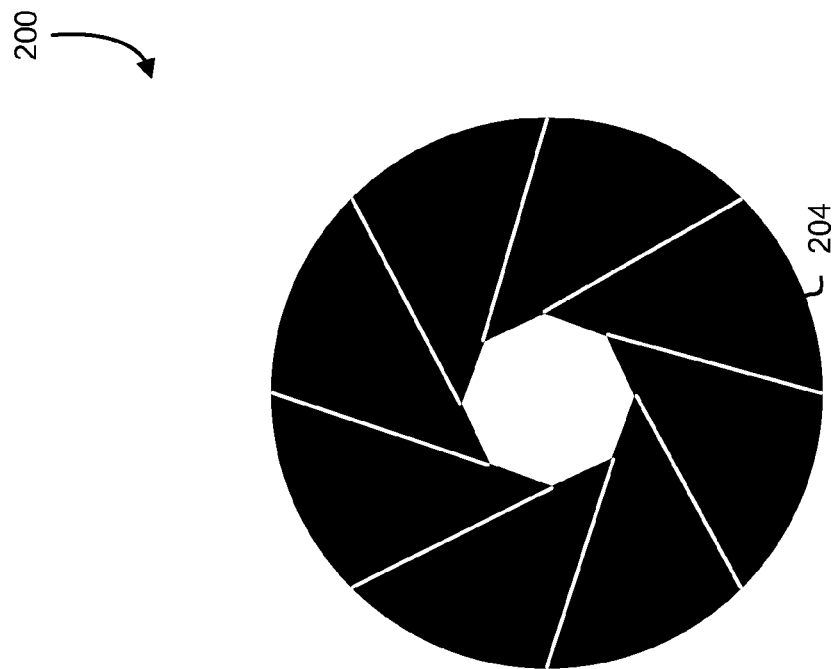
FIG. 2 illustrates operations of a typical aperture.
Figure 2:
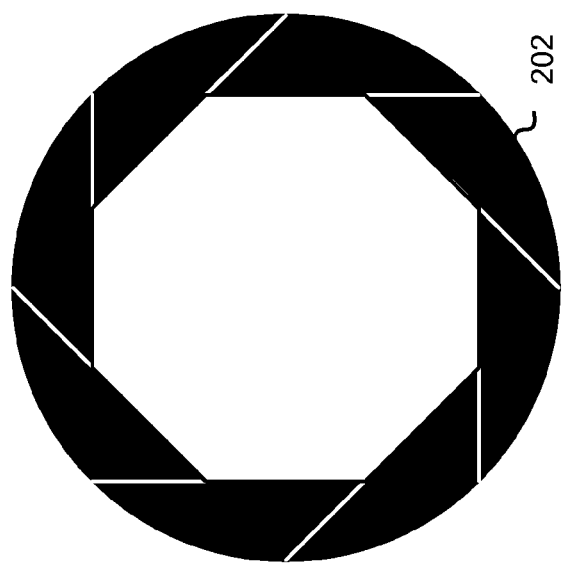

FIG. 2 illustrates an example 200 of the typical operation of a shutter and an aperture. An aperture is an opening that permits light to reach an image recording component; that is, the aperture may be an opening through which light travels, positioned in front of or behind a lens or in front of a sensor. The size of the aperture may determine the sharpness of objects in an image that not at the focal plane of the image capture device. Light is permitted to pass through the aperture by a component before or after the lens or sensor, called a shutter. The example 200 depicts a wide aperture 202 and a narrow aperture 204. Apertures are often, but not always, controlled by a shutter, which may be comprised of one or more movable blades that may operate to increase or decrease the size of the aperture. The size of the aperture determines how close to parallel the light rays passing through the aperture will be. For example, the wide aperture 202 allows inbound light rays from more angles than the narrow aperture 204 to reach the image recording component. The result being that an image captured by an image capture device with the wide aperture 202 has sharp focus only for rays within a narrow range of focal length, whereas an image captured by an image capture device with the narrow aperture 204 has sharp focus at a wider range of focal length. However, because the aperture size determines how many rays actually reach the image recording component, to achieve the same level of brightness, an image capture event will need a longer exposure time when using the narrow aperture 204 than when using the wide aperture 202.

The aperture may be changed in a variety of ways. In one example, during the same exposure or between exposures, an aperture may be at least partially rotated. In this example, it is preferable that the aperture shape not be round, as a circular shape looks the same at any degree of rotation, making it difficult to distinguish the bokeh artifacts with the initial aperture shape from the bokeh artifacts with the changed aperture shape. An advantage of rotating the aperture shape is that the area of the aperture remains constant and allows the same amount of light to pass through regardless of the amount of rotation. In another example, the aperture rotates during the exposure or between exposures until it has the same shape as the initial aperture shape. Examples of apertures rotating until they look the same as when they started include, but are not limited to, an aperture in the shape of a five-pointed star that rotates 72 degrees, an aperture in the shape of an equal cross that rotates 90 degrees, an aperture in the shape of an isosceles triangle that rotates 120 degrees, an aperture in the shape of the letter "S" that rotates 180 degrees, an aperture in the shape of the letter "L" that rotates 360 degrees. An advantage to rotating the aperture shape until it has the same shape as the initial aperture shape may be that, because the area covered by the shape during the rotation would be circular if the rotation begins and ends within the same exposure period, the bokeh artifacts on stationary out-of-focus objects, will appear circular and more natural to the eye, whereas the bokeh artifacts caused by motion blur may not be circular and may therefore be more easily distinguished from the out-of-focus blurred objects. An advantage to using a distinguishable aperture shape that achieves the appearance of the initial aperture shape with fewer degrees of rotation includes that the rotation may be performed more quickly during the exposure period.

In another embodiment usable in combination with other embodiments, the aperture changes to a different shape (i.e., different in form) during the exposure or between exposures. An example of an aperture that changes to a different shape includes, but is not limited to, an initial aperture shape that may be in the shape of a cross, but during the exposure or between exposures it may switch to be in the shape of a star. In yet another embodiment usable in combination with other embodiments, the aperture may change shape a plurality of times during the exposure or between exposures.

As another embodiment usable in combination with other embodiments, the aperture may change in size during the exposure or between exposures. Examples of the aperture changing size during the exposure include, but are not limited to, an aperture that grows larger during the exposure, an aperture that shrinks during the exposure, an aperture that grows and then shrinks during the exposure, or an aperture that quickly changes from one size to another. An advantage of an aperture changing in size may be that that a smaller aperture may have a greater depth of field than a larger aperture, and consequently more objects may appear in focus with the smaller aperture. Hence, by analyzing the occurrences of bokeh artifacts with the aperture shape as it changes in size during the exposure or between exposures, information about the depth of objects within the scene may be determined.

As noted above, an aperture may be of any shape, however, the more distinctive the shape the easier it may be to detect occurrences of bokeh artifacts with the shape within a captured image. For example, an aperture having the shape of a cross may create cross-shaped bokeh artifacts in a captured image, which may be easier to detect than a round aperture that creates round bokeh artifacts in a captured image. In some instances, the initial aperture is round. In another embodiment usable in combination with other embodiments, the initial aperture is a shape that has greater than 1-fold rotational symmetry. In other instances, the initial aperture has rotational symmetry having greater than 2-fold rotational symmetry. Examples of initial apertures with rotational symmetry having an order greater than two includes, but is not limited to, an equilaterally triangular aperture, a square aperture, a cross-shaped aperture having arms of equal length and a star-polygon aperture having four or more points.

In some instances, the initial aperture has bilateral symmetry. Examples of initial apertures with bilateral symmetry include, but are not limited to an isosceles triangular-shaped aperture and a cross-shaped aperture having a first two arms of equal length and a second two arms of equal length but of a different length than the first two arms. In other instances, the initial aperture is asymmetric. An example of an asymmetric aperture includes, but is not limited to, an aperture in the shape of the letter "L."

Figure 3:
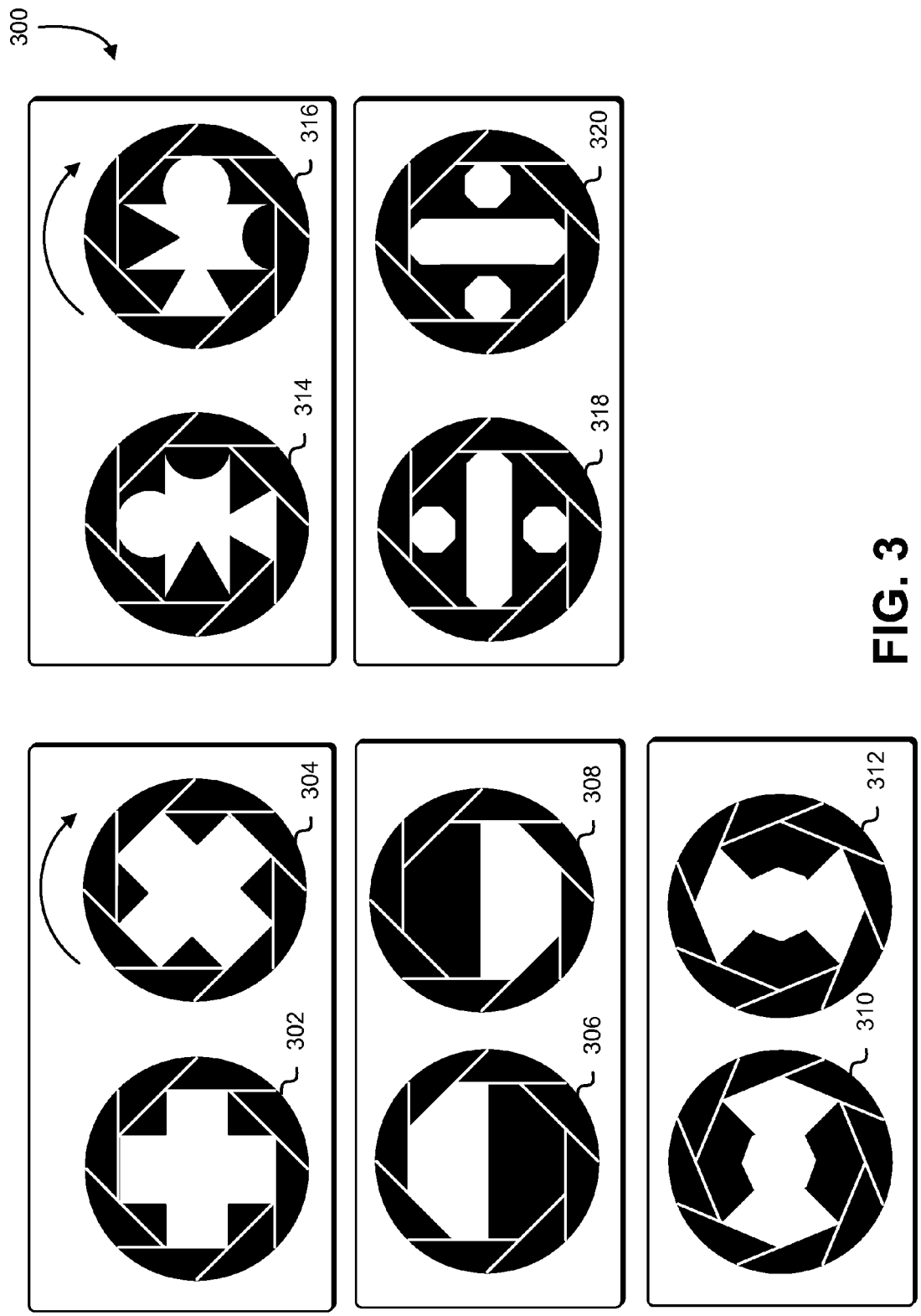
FIG. 3 illustrates a variety of aperture shapes in accordance with at least an embodiment.

FIG. 3 illustrates an example 300 of some of the various apertures which may be used in many of the embodiments of the present disclosure. As illustrated in FIG. 3, the example 300 includes a cross-shaped aperture 302, which may be switched or rotated, as depicted by the rotated cross-shaped aperture 304. The cross-shaped aperture may be smoothly and/or continually rotated any number of degrees, or rapidly rotated or switched to any angle of rotation. The cross-shaped aperture 302 has $4^{th}$-order rotational symmetry; that is, when the cross-shaped aperture 302 is rotated 90 degrees, it has the same appearance as when it started. Example 300 also includes an illustration of an aperture that alternates between a first alternating state 306 and a second alternating state 308. The states may be alternated between the first alternating state and the second alternating state by mechanical method or an electrical method (e.g., LCD). In some instances, the first alternating aperture state 306 may transform to the second alternating aperture shape 308 through rotation rather than being mechanically or electrically switched.

Example 300 further includes an illustration of an aperture 310, also shown rotated by 90 degrees as aperture 312. Aperture 310 has $2^{nd}$-order rotational symmetry; that is, when the aperture 310 is rotated 180 degrees, it has the same appearance as when it started. In some instances, aperture 310 may be mechanically or electrically switched between aperture 310 and aperture 312 without rotation. Example 300 further includes an aperture 314, also shown rotated by 90 degrees as aperture 316. Aperture 314 has 1-fold symmetry (i.e., asymmetrical), and therefore must be rotated 360 degrees to achieve the same appearance as when it started.

Example 300 further includes an embodiment in which an aperture may have two or more openings. For example, aperture 318 is illustrated as having three openings; however an aperture of the present disclosure may comprise any number of openings. Aperture 320 illustrates a 90 degree rotation of the aperture 318.

Figure 4:
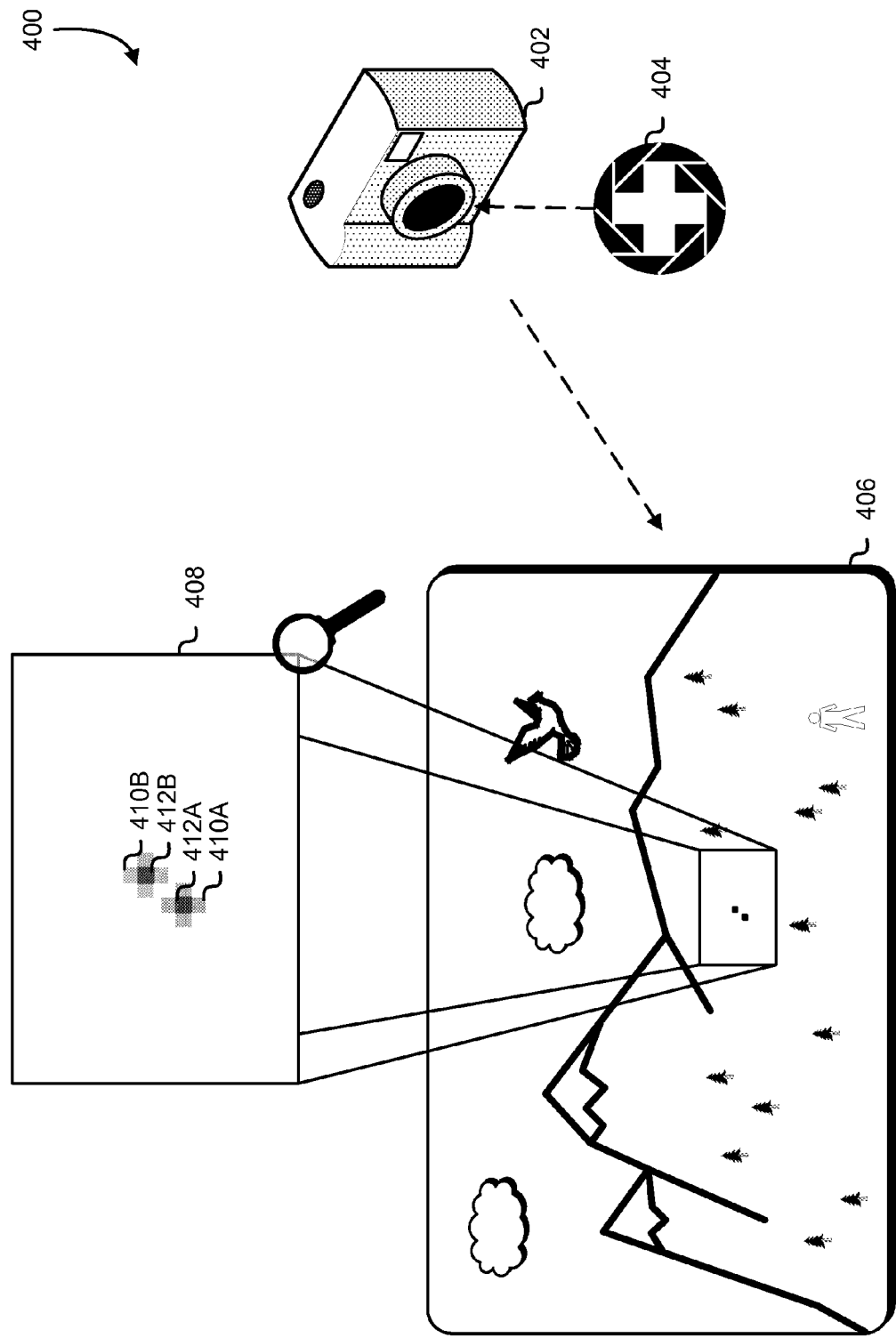
FIG. 4 illustrates the changing aperture shape as reflected by blurred object moving over time in accordance with at least an embodiment.

FIG. 4 illustrates an aspect of an environment 400 in which an embodiment of the present disclosure may be practiced. As illustrated in FIG. 4, the environment 400 may include an image capture device 402 with a distinguishable aperture shape 404 capturing an image of a scene 406. As noted, the image capture 402 may be any device usable for capturing images, including, but not limited to, still cameras and movie cameras that capture images from light using film or from light using analog or digital electronic means, such as image sensors, such devices may include, but are not limited to, video cameras, digital cameras, cellular phone cameras, and film cameras. Although the aperture shape 404 may is shown as a cross-shape, this is for illustrative purposes only, and the aperture shape 404 may be any distinguishable shape, including, but not limited to, the aperture shapes of example 300 in FIG. 3. Similarly, the scene 406 may be any scene.

Blurring may occur within a captured image as focal blurring or motion blurring. Focal blurring occurs when light rays bouncing from an object do not converge in the image. If an aperture is wide, an image is sharp for objects that the lens is focusing on, but other objects are blurred; in other words, an object in a scene may appear blurry if the object is captured at a different distance of a focal point of the lens. Whereas, if an aperture is narrow (i.e., small) the image is sharper. The smaller the aperture, the less light enters through the aperture, so the shutter must be held open for a longer period to capture enough light for a proper exposure.

Blur occurs when an image capture device or an object moves during the exposure period. Motion blur may be caused by movement of the image capture device relative to an object during an image capture, which may be a linear and/or rotational motion with constant or variable velocity. Motion blur may further be caused by one or more objects in motion within the scene, such object motion may also be linear and/or rotational with constant or variable velocity with respect to the image capture device. Although blur may be desirable in some images for artistic purposes, blurring in other images may be undesirable. If unwanted blurring occurs within an image, deblurring processing may be performed on the image to attempt to reduce or eliminate blurring in the image. Examining the scene 406 up close, the effect that the aperture shape 404 produces on objects that are blurred can be seen. In the zoomed view 408, bokeh artifacts 410A and 410B in the shape of aperture 404 can be seen at the locations of boulders 412A and 412B, indicating that this region has experienced blurring.

In an embodiment the aperture changes during the exposure. In this embodiment, a single image is captured and the image is analyzed for occurrences of bokeh artifacts with the initial aperture shape and bokeh artifacts with the changed shape within that image.

In another embodiment usable in combination with other embodiments, the aperture is different between at least two consecutive exposures. In this embodiment, the image capture device may capture two images in succession; the first image being captured with the initial aperture shape and the next image being captured with the changed aperture shape. Further, in this embodiment the first image is analyzed for occurrences of bokeh artifacts with the initial aperture shape and the next image is analyzed for occurrences of bokeh artifacts with the changed aperture shape corresponding to the occurrences of the bokeh artifacts with the initial aperture shape found in the first image. Also in this embodiment, the occurrences found in the first image are compared with the occurrences found in the next image to ascertain information about motion of the camera and motion of the objects within the scene.

In another embodiment usable in combination with other embodiments, the aperture is different between at least two different image capture devices. An example of an aperture that differs between two lenses includes, but is not limited to, an aperture having an initial aperture shape on one image capture device and an aperture having a changed shape on another image capture device. In this embodiment, each of the image capture devices may capture an image simultaneously, with the image captured by the first image capture device containing occurrences of bokeh artifacts with one aperture shape and the image captured by the other image capture device containing occurrences of bokeh artifacts with the same or different aperture shape.

In this embodiment, the separate images may be subjected to parallax processing to remove parallax effects caused by the offset of the image capture devices from each other. For example, bokeh artifacts in a first image captured by a first image capture device and corresponding bokeh artifacts in a second image captured by a second image capture device may be displaced by a certain distance due to a parallax effect caused by the distance between the first and second image capture devices, a distance of each image capture device to objects in the scene, and the angle of the objects from the normal direction of the image capture devices. By using information known about the distance to the focal plane and a depth of objects in motion in the scene as determined from the bokeh artifacts, displacement of the positions between corresponding bokeh artifacts in each image may be corrected. Note that this is only one method of parallax processing that may be used in the present disclosure, and, as such, any manner of parallax processing of two images in hardware or software, such as with image stitching techniques, as would be understood by a person having ordinary skill in the art may be considered as within the scope of the present disclosure. Furthermore, in this embodiment the occurrences found in one image are compared with the occurrences found in the other image to ascertain information about motion of the camera and motion of the objects within the scene. In some instances, the apertures of each image capture device are the same shape. In other instances, an aperture of one image capture device does not change during the exposure or between exposures, whereas an aperture of the other image capture device does change during the exposure or between exposures. In yet another embodiment usable in combination with other embodiments, the other image capture device captures the image in black-and-white (i.e., monochrome). In some instances of embodiments having multiple image capture devices, the shapes of the apertures of each image capture device are different. In other instances of embodiments having multiple image capture devices, the image capture quality may be configured differently between each image capture device.

Note that, for the purposes of this disclosure, wherever this disclosure refers to bokeh artifacts with an initial aperture shape and bokeh artifacts with a changed aperture shape, the aperture shape may change a plurality of times, with the bokeh artifacts with the aperture shape occurring before the next change of the aperture being considered the initial shape. For example, the aperture shape may be smoothly rotated from anywhere from zero to 360 degrees within a single exposure, and the initial aperture shape and the changed aperture shape may be detectable as bokeh artifacts with slight differences of rotational degree. Likewise, where this disclosure refers to a first image and a next image, the next image may be a plurality of images, such as a series of images captured over a certain time period, and the image captured before each next image being considered as the first image for this disclosure.

Figure 5:
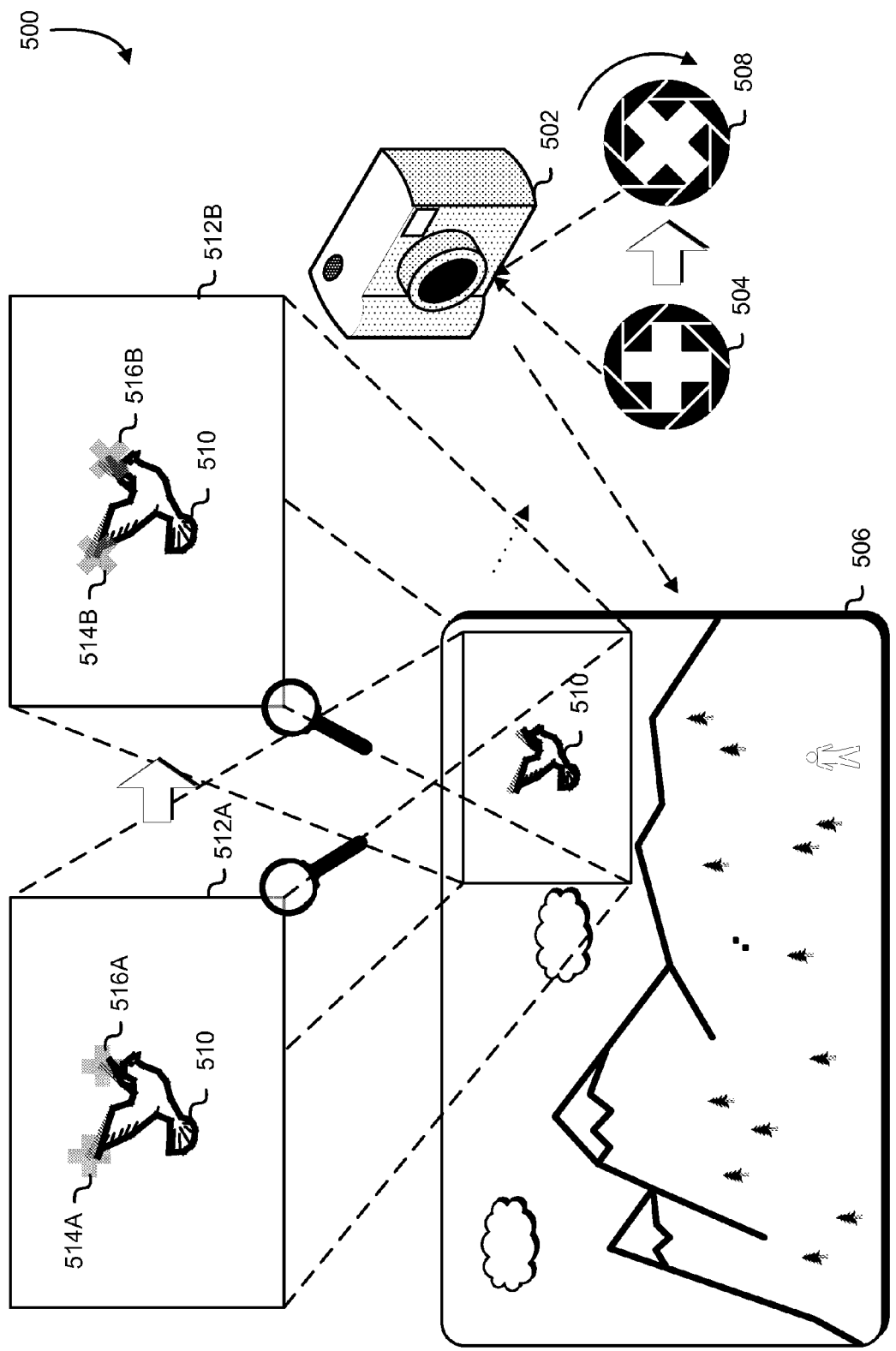
FIG. 5 illustrates bokeh artifacts that may be produced when objects are blurred in accordance with at least an embodiment.

As illustrated in FIG. 5, the environment 500 may include an image capture device 502 with a distinguishable aperture shape 504 capturing an image of a scene 506. As noted, the image capture 502 may be any device usable for capturing images, including, but not limited to, still cameras and movie cameras that capture images from light using film or from light using analog or digital electronic means, such as image sensors, such devices may include, but are not limited to, video cameras, digital cameras, cellular phone cameras, and film cameras. Although the aperture shape 504 may is shown as a cross-shape, this is for illustrative purposes only, and the aperture shape 504 may be any distinguishable shape, including, but not limited to, the aperture shapes of example 300 in FIG. 3. Similarly, the scene 506 may be any scene. During the image capture of the scene, the aperture shape 504 may be rotated or switched to form aperture shape 508 during the exposure or between exposures of the image capture event. Examining the scene 506 up close, the effect that the aperture shapes 504 and 508 produce on objects that are blurred may be seen. In this scene 506, a bird 510 is an object in motion within the scene, and the flapping of the wings of the bird 510 has produced blurring during the image capture event. In the zoomed view 512A, bokeh artifacts 514A and 516A in the shape of aperture 504 are produced at the position of the wingtips of the bird 510 at a first stage of the exposure due to motion blur during the exposure. Later during the image capture event, the zoomed view 512B depicts bokeh artifacts 514B and 516B in the shape of the aperture 508 at the position of the wingtips of bird 510 at this later stage. In an embodiment, the image capture event may occur over a single exposure. In another embodiment usable in combination with other embodiments, the image capture event may comprise successive image captures over time. In yet another embodiment usable in combination with other embodiments, the image capture event may comprise capturing simultaneous multiple images using multiple image capture devices. An example of an image capture event capturing simultaneous multiple images using multiple image capture devices includes, but is not limited to, a digital camera with multiple image sensors and each sensor captures a separate image concurrently with the other sensors. In this embodiment, the multiple images may be subjected to parallax processing to remove parallax effects caused by the offset of the image capture devices from each other.

Note that in this illustration of the environment 500, the bokeh artifacts captured at the different stages of the image capture event correspond with each other. For example, bokeh artifact 514A corresponds with bokeh artifact 514B and bokeh artifact 516A corresponds with bokeh artifact 516B. By analyzing the changes between the corresponding artifacts, such as changes in position, size, and brightness, information about the motion (i.e., the motion vectors) of objects, in this example being the wingtips of the bird 510, located at the region of the bokeh artifacts, such as the objects' speed, distance, and direction of travel, can be acquired. With knowledge of information about the motion responsible for causing the blurring, deconvolution processing can be made to more effectively remove blurring from the image at those regions.

Figure 6:
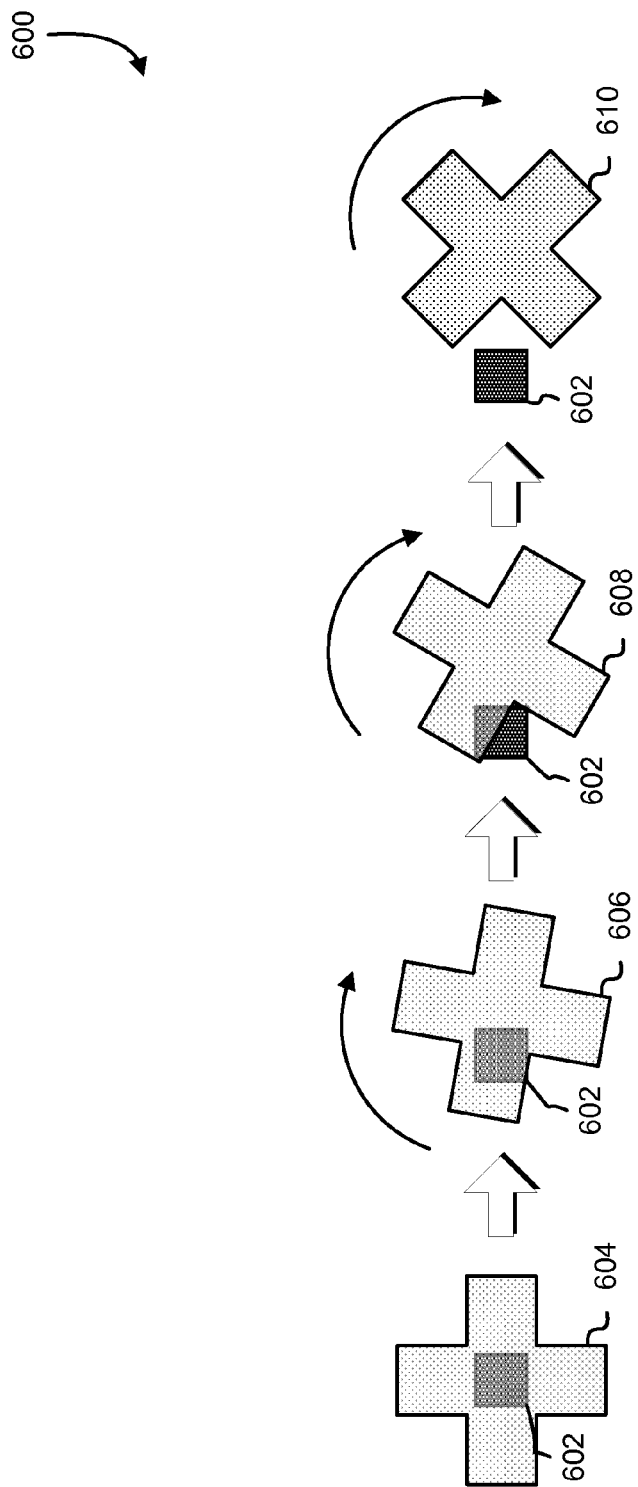
FIG. 6 illustrates an effect that may be produced on blurred objects by a changing aperture in accordance with at least an embodiment.

FIG. 6 illustrates an effect of an embodiment of the present disclosure in an environment 600. As illustrated in FIG. 6, environment 600 depicts an in-focus stationary object 602 contrasted to bokeh artifacts 604, 606, 608, and 610 depicted at various stages of an exposure or between exposures. For example, an initial position of an aperture produces a bokeh artifact 604 for an object in motion that overlaps stationary object 602. In a next stage or next exposure, the aperture has slightly rotated, which is reflected by the bokeh artifact 606, which is slightly rotated from the earlier bokeh artifact 604. Additionally, the bokeh artifact 606 has displaced slightly to the right of stationary object 602, compared to the earlier bokeh artifact 604. In the next stage or next exposure, the aperture has continued to rotate, as reflected by bokeh artifact 608, which is also further displaced to the right of stationary object 602. In the final stage on exposure depicted in example 600, the aperture has continued to rotate, as reflected by bokeh artifact 610, which is still further displaced to the right of stationary object 602. By analyzing the bokeh artifacts at each stage, information, such as the motion vectors of objects in motion, may be obtained about the motion of the over time, and this information may be used to remove or reduce motion blur from the captured image or images. In some instances, the aperture continues to rotate beyond the 45 degree rotation depicted by bokeh artifacts 604, 606, 608, and 610. In another embodiment usable in combination with other embodiments, the aperture rotates until a point at which further rotation would depict a shape identical to the shape of the first bokeh artifact. In other instances, the rotations may occur during a single exposure. In still other instances, the rotations may occur between exposures.

A shape of a blur may be generated by an aperture having a particular shape at the beginning of an exposure and the aperture having another shape at the end of the exposure. In this example, one end of the shape may be comprised of at least a portion of a shape of the aperture at the beginning of the exposure, and the opposite end of the shape may be comprised of at least a portion of the shape of the aperture at the end of the exposure. In other words, the shape of the bokeh artifact may be a continuous shape formed from the changes of the aperture shape, the continuous shape corresponding to the blur of an object in motion within the scene. Because the speed and direction travel by the object in motion within the scene affects the displacement between the locations of the occurrence of particular shape at the beginning of the exposure and the particular shape at the end of the exposure, the orientation (i.e., angle) and magnitude (i.e., length) of the shape will consequently be affected by the speed and direction travel by the object in motion. Hence, information about the image, such as the speeds and directions of motion of objects within a scene may be determined from the orientation and magnitudes of the bokeh artifacts within the captured image.

In such a case, shape detection algorithms may be used to detect the bokeh artifacts created by the changing aperture. That is, given an aperture of a known shape at the beginning of an exposure, such as a cross-shape, and an aperture of another known shape at the end of the exposure, such as an x-shape, a shape detection algorithm may be used to detect variations on the shapes that may be produced from a cross-shape in motion that transitions to an x-shape in motion. In an example where the exposure period is relatively short, the direction of travel by the cross-shape and the x-shape may be predominantly linear; therefore the shape detection algorithm may be simplified by only detecting the shapes that may be produced by linear motion. In some examples, one or more data tables may be used to store information regarding a sufficient quantity of pre-determined shapes (i.e., shapes that may be produced by varying directions of motion, such as, for example, a table of 24 shapes produced by linear motion at 15 degree intervals). In this example, the shape detection algorithm may be simplified by referring to a table of predicted shapes and the algorithm need only search for variations of the length of the predicted shapes.

Figure 7:
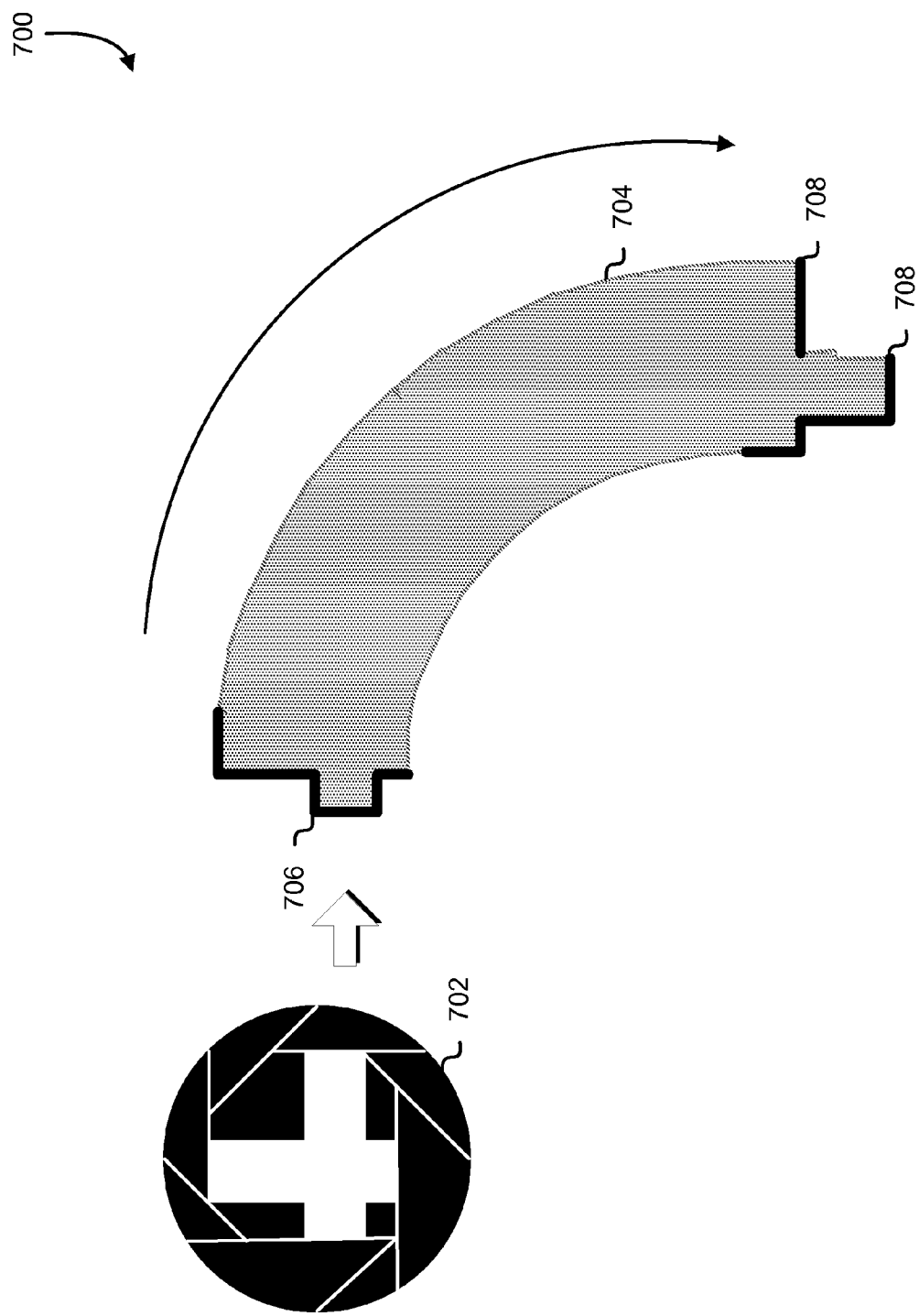
FIG. 7 illustrates edge detection of an aperture shape in accordance with at least an embodiment.

FIG. 7 illustrates an effect of an embodiment of the present disclosure in an environment 700. As illustrated in FIG. 7, the environment 700 depicts the effect a distinguishable aperture shape 702 may have over a particular exposure. The aperture shape 702 is depicted with 2-fold rotational symmetry for illustrative purposes only, and may be any distinguishable shape, including, but not limited to, the aperture shapes of example 300 in FIG. 3. In the example depicted in environment 700, an image capture event captures an object in motion, causing bokeh artifacts over the exposure while aperture 702 is being rotated. The bokeh artifacts captured over the exposure may appear in the captured image to be a merged blur 704 of the rotated aperture shape 702. However, using an edge detection algorithm, the position of a bokeh artifact with an initial aperture shape can be determined by detecting the edges 706 of the bokeh artifact with the initial aperture shape. Likewise, the position of a bokeh artifact with a changed aperture shape can be determined by detecting the edges 708 of the bokeh artifact with the changed aperture shape.

Information about the motion of the object, such as such as direction and angle of motion of the camera and objects in the scene, speed, location of objects in the scene, and location of objects relative to the image capture device, may then be determined by analyzing the differences between the bokeh artifact defined by the edges 706 with the initial aperture shape defined and the bokeh artifact defined by the edges 708 with the changed aperture shape. Deconvolution processing may then be performed using this information to provide a sharper image with a reduction or elimination of blurring.

Figure 8:
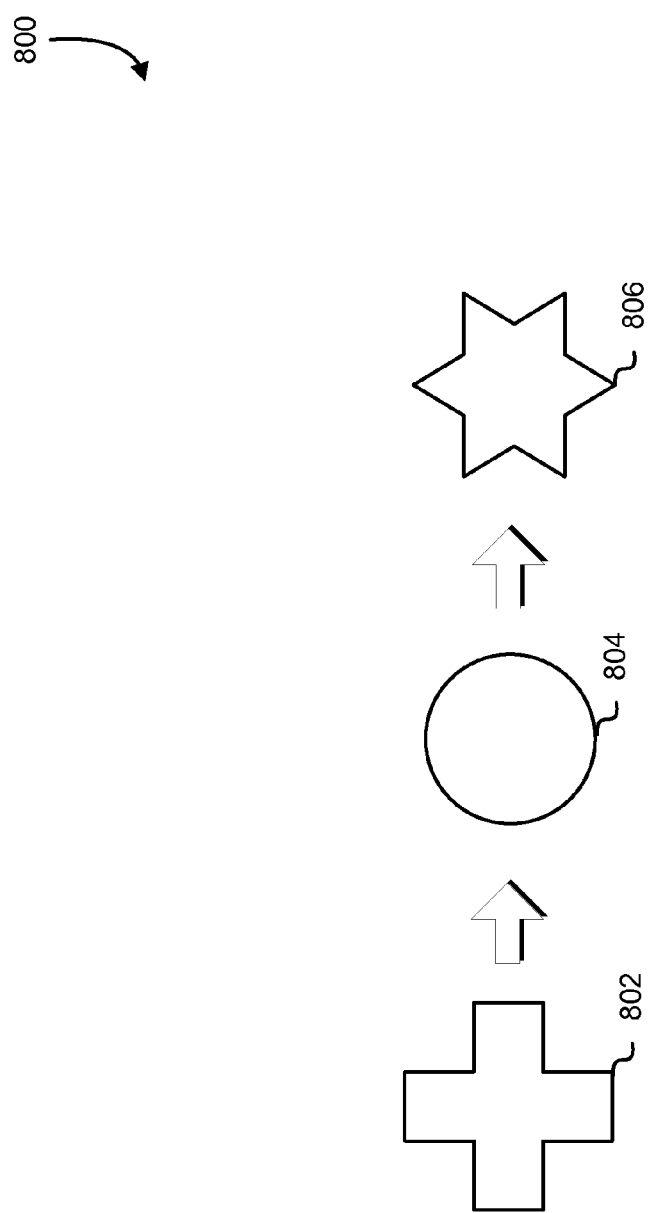
FIG. 8 illustrates a progression of aperture shapes that may occur during an image capture event in accordance with at least an embodiment.

FIG. 8 illustrates an aspect of an environment 800 in which an embodiment of the present disclosure may be practiced. As illustrated in FIG. 8, the environment 800 may include apertures that change in shape during an exposure or between exposures. In this example, an initial aperture 802 has an initial shape for at least a first portion of an exposure, whereupon the aperture is changed to a next shape 804 for a next exposure or portion of the exposure. In this example, the next shape 804 may further be changed to a final shape 806 for a final exposure or portion of the exposure. Note that if the area of the aperture remains the same between the different shapes of apertures, the exposure period associated with each change in aperture may be the same for the same amount of light to be captured by the image capture device. If the area of the aperture differs between shapes, the exposure periods for apertures having smaller areas may need to be longer to achieve the same level of brightness as compared to the exposure periods for apertures having larger areas. In some instances, the aperture may not be changed after the next shape. In other instances, the aperture may change three or more times.

Figure 9:
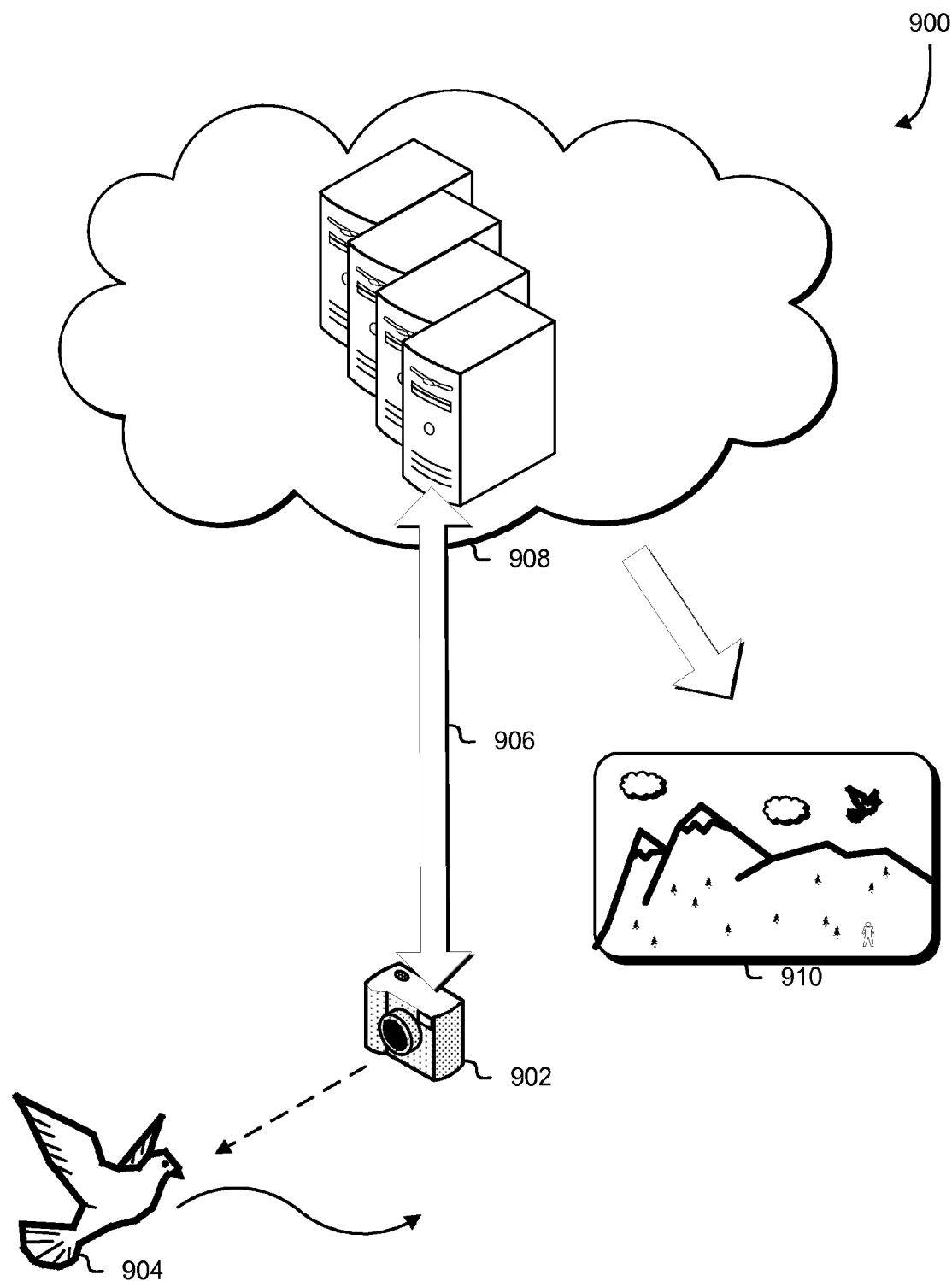
FIG. 9 illustrates an example of remote processing for deblurring operations in accordance with at least an embodiment.

As illustrated in FIG. 9, the environment 900 may include an image capture device 902 capturing an image of a scene according to various embodiments of the present disclosure. For purposes of illustration, the image capture device 902 in environment 900 is depicted as capturing an image of a bird 904 in flight; however the captured scene may be any scene. As noted, the image capture device 902 may be any device usable for capturing images, including, but not limited to, still cameras and movie cameras that capture images from light. The device may comprise a lens and an external housing enclosing a recorder component for capturing the images from light, such as film or analog or digital electronic means, such as image sensors. Such devices may include, but are not limited to, video cameras, digital cameras, cellular phone cameras, and film cameras. Further, the image capture event may include a single image, multiple images captured sequentially, or multiple images captured concurrently.

In the environment 900 depicted in FIG. 9, an image is captured by the image capture device 902 and transferred or copied through a communication channel 906 to one or more external devices 908. The communication channel 906 may be any type of communication channel by which two or more devices may communicate, including, but not limited to, physical network cables, wireless communications, universal serial bus (USB), serial, parallel, and other conduits. The communication channel 906 may further be configured to communicate through, among others, the Internet, an intranet, wide area network (WAN), local area network (LAN), and direct connection. The communication channel 906 may further be configured to facilitate communications of any type of communication protocol, including a cellular wireless communications protocol, such as fourth generation (4G) communications or long term evolution (LTE™), a wireless local area network (WLAN) communications protocol, such as an Institute for Electrical and Electronics Engineers (IEEE) 802.11, 802.16 or 802.21 communication protocol, or short range communications protocol, among others.

The communications channel 906 may also represent the physical movement of media holding an image, such as transporting a flash card, USB drive, magnetic media, optical media, or some other media to another device which may further copy or transfer the image to one or more other media or to the one or more external devices 908. From there, the image may be further copied to one or more other media, or may be accessed by the one or more external devices 908. The one or more external devices 908 may comprise a single computer, laptop, tablet, server, distributed computing system, one or more virtual computing devices executing on one or more physical devices or configured to execute instructions for performing data computation, manipulation or storage tasks. The one or more external devices 908 further be connected to the image capture device 902

The one or more external devices may perform at least a portion of the deblurring operations described on the image to produce one or more images 910 with blurring reduced or eliminated. Advantages of transferring an image to the one or more external devices 908 may include, but not be limited to, access to increased processing power for more efficient image processing than may be performed on the image capture device 902 alone, immediate sharing of image with other users having access to the one or more external devices 908, and taking advantage of increased data storage capability of the one or more external devices 908 than may be available on the image capture device 902.

Figure 10:
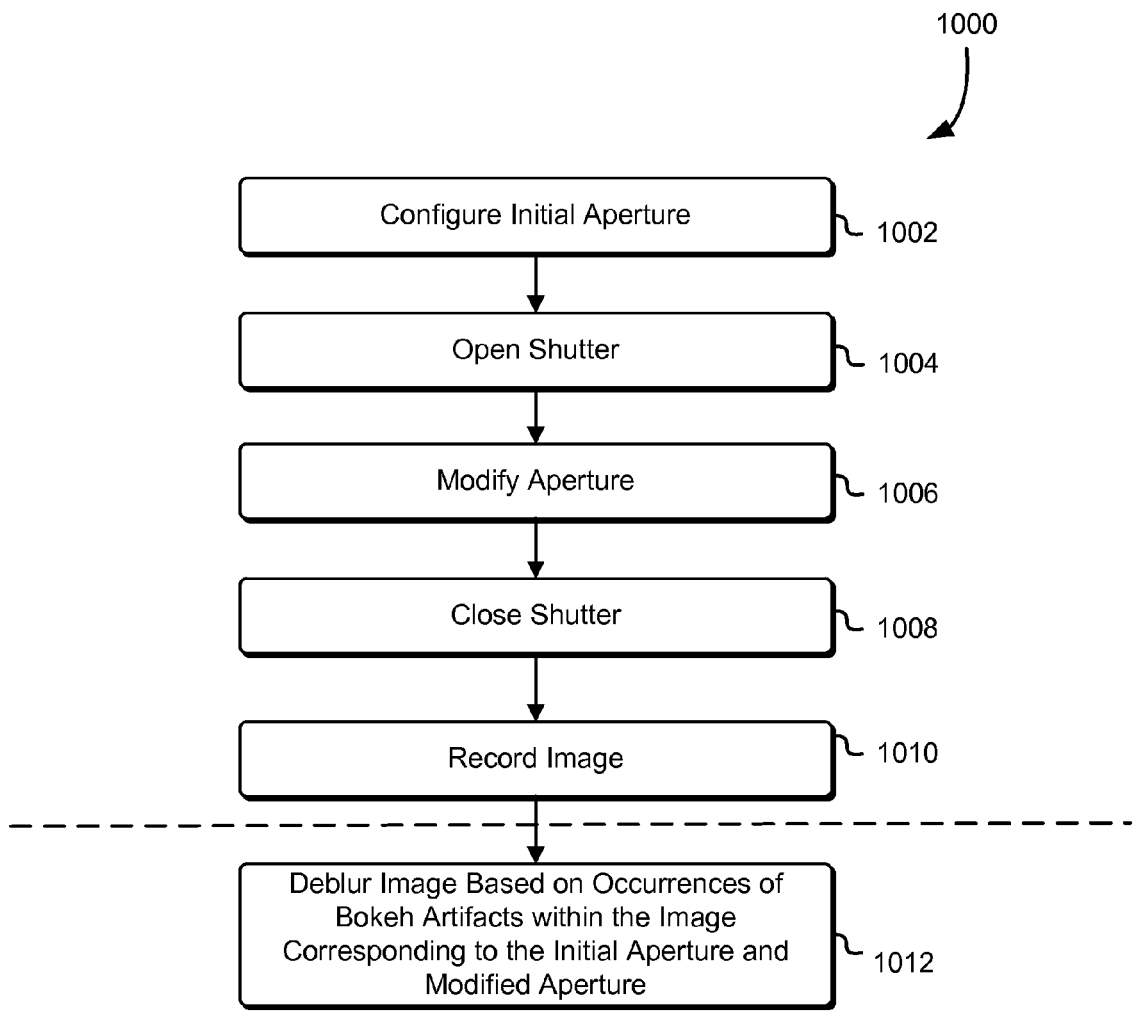
FIG. 10 is a block diagram that illustrates the operation of an image capture device in accordance with at least an embodiment.

FIG. 10 is a block diagram illustrating an example of a process 1000 for capturing and deblurring an image in accordance with various embodiments. The process 1000 may be performed by any suitable image capture device, such as any of the user devices described in FIG. 1. The process 1000 includes a series of operations in which an image capture device with a variable aperture captures an image over one or more exposures and performs deblurring operation based on bokeh artifacts detected in the captured image. In 1002, an aperture of an image capture device may be configured to be a distinguishable shape. As noted, the distinguishable shape may be any shape, including, but not limited to, the aperture shapes disclosed regarding FIG. 3.

In 1004, a shutter of the image capture device may be opened to allow light to enter the aperture configured in 1002 to reach an image recording component. Examples of a shutter include, but are not limited to, a mechanical shutter with one or more movable blades and an electronic shutter, such as an LCD. It is noted that the image capture device may not necessarily have a shutter, and, in such a case, 1004 may be omitted or replaced with a step operating analogous to opening a shutter, including, but not limited to, enabling power to an image recording component. It is further noted that 1002 may occur in concurrence with or at any time before 1004.

In 1006, the aperture may be modified to be different than the aperture configured in 1002. It is noted that the shutter may be closed after between operations 1004 and 1006, and reopened after 1006. It is noted that operations 1004-1006 may be repeated often as desired, according to the various embodiments disclosed.

In 1008, the shutter of the image capture device may be closed to prevent further light from reaching the recording component through the aperture. It is noted that the image capture device may not necessarily have a shutter, and, in such a case, 1008 may be omitted or replaced with a step operating analogous to closing a shutter, including, but not limited to, disabling power to an image recording component. It is further noted that if the shutter is closed before operation 1008, it may be reopened between operations 1006 and 1008.

In 1010, the recording of the image may be finalized. It is noted that image recording process, such as for an image capture device that records image onto a film medium, may begin at or before 1002 and may be an ongoing process throughout any or all operations 1002-1010. Likewise, if the image recording component is an electronic device, the image recording process may be a process that stores and/or updates an image onto computer-readable media throughout any or all operations 1002-1010.

In 1012, a deblurring operation may be performed on one or more captured images recorded during one or more operations 1002-1010, according to the various embodiments described. The dashed line indicates that the deblurring operation may be performed by either the image capture device described in 1002 performing steps 1002-1010 or may be performed by one or more external devices 908 described regard to in FIG. 9. The deblurring operation may be performed immediately following 1010, or at any time thereafter.

It is noted that the operations of process 1000 may be performed in various orders, including in parallel, and each operation may be performed by one or more devices different from the devices performing any of the other operations in process 1000. It is further noted that one or more image capture devices may be duplicating the operations of process 1000 in various orders, including, but not limited to, sequentially, in parallel, or in concurrence. It is further noted that the operations of process 1000 may be performed to capture one image in a single exposure, one image over multiple exposures, or multiple images having multiple exposures.

As noted above, the disclosure may be practiced using one image or more images captured by an image capture device. Likewise, the disclosure may be practiced using a plurality of images captured by one or more image capture devices. In an embodiment, only one image is captured and the deconvoluting is performed on the single image based on the detected blurring within the image. In another embodiment usable in combination with other embodiments, two or more images are captured and the deconvoluting is performed on an image based at least in part on detected blurring within at least one of the other images. For example, a series of consecutive images may be captured by image capture device with a cross-shaped aperture, and, between each image capture, the aperture may be rotated by 15 degrees.

In an embodiment, two or more images are captured where an image may be polychromatic and another image may be monochromatic (e.g., black-and-white, grayscale, etc.). In another embodiment usable in combination with other embodiments, the polychromatic and monochromatic images are each captured with a different image capture device. In yet another embodiment usable in combination with other embodiments, the image quality between the polychromatic image capture and the monochromatic image capture is changed. An example of an embodiment with a polychromatic image capture and a monochromatic image capture includes, but is not limited to where a color image is captured with one image capture device simultaneously with a black-and-white image capture by another image capture device and the black-and-white image is captured with a higher gain and higher sharpness than the color image. In this embodiment, as in other embodiments comprising multiple image capture devices, the separate images may be subjected to parallax processing to remove parallax effects caused by the offset of the image capture devices from each other.

As yet another alternate embodiment, the aperture of the polychromatic image exposure is not changed, but the aperture of the monochromatic image exposure is changed during the exposure. An example of an embodiment where the aperture of the polychromatic image exposure is not changed, but the aperture of the monochromatic image exposure is changed includes, but is not limited to, the example of the polychromatic image capture and polychromatic image capture described above and the aperture is changed during the monochromatic image exposure and the camera motion and object motion within the scene is detected using the process for detecting bokeh artifacts with the initial aperture shape and bokeh artifacts with the changed aperture shape as described. As still another embodiment usable in combination with other embodiments, the aperture of the monochromatic image exposure is not changed, but the aperture of the polychromatic image exposure is changed during the exposure.

In some instances, the information determined from the analyzed difference between the detected bokeh artifacts with the initial aperture shape and bokeh artifacts with the changed aperture shape from an image is used to perform deblurring on a different image. An example of this instance includes but is not limited to, the example of the polychromatic image capture and polychromatic image capture described above in which the information determined from analyzing the monochromatic image is used to perform deblurring in the polychromatic image.

In other instances, two or more monochromatic images are captured. An example of an instance where two or more monochromatic images are captured includes, but is not limited to, an instance where images are captured on separate red, green, and blue channels and deblurring is performed on each of the red, green, and blue monochromatic images as described before the images are composited.

Deblurring may be performed by analyzing occurrences of bokeh artifacts with an initial aperture shape within a captured image. Occurrences of bokeh artifacts with the initial aperture shape may indicate that blurring is occurring in that region of the image. During the exposure of the image or between different exposures of one or more images, the aperture shape is changed (e.g., changed in size, rotated, changed in shape, etc.), and the image or the one or more images are analyzed for occurrences of bokeh artifacts with the changed aperture shape. Occurrences of bokeh artifacts with the changed aperture shape in the image or in the one or more images preferably have one-to-one correspondence with the occurrences of the bokeh artifacts with the initial aperture shape in the image. Once the occurrences of the bokeh artifacts with the changed aperture shape are matched with the occurrences of the bokeh artifacts with the initial aperture shape, processing may be performed to determine information about the motion at and between the locations of the bokeh artifacts within the image, such as direction and angle of motion of the camera and objects in the scene, speed, location of objects in the scene, and location of objects relative to the image capture device. Deconvolution processing may be performed using this information to provide a sharper image with a reduction or elimination of blurring. In an embodiment, an image capture device comprises a motion sensing component and a first deblurring processing may be performed based on information gathered from the motion sensing component before deblurring processing based on the information determined from the differences between bokeh artifacts with the initial aperture shape and bokeh artifacts with the changed aperture shape. In yet another embodiment usable in combination with other embodiments where the image capture device comprises a motion sensing component, deconvolution processing may be performed based on both the information gathered from the motion sensing component and the information determined from the differences between the bokeh artifacts with the initial aperture shape and the bokeh artifacts with the changed aperture shape.

In some instances, if no one-to-one correspondences between each bokeh artifacts with an initial aperture shape and bokeh artifacts with a changed aperture shape are found, deblurring may still be performed using a blind deconvolution algorithm. In other instances where the image capture device comprises a motion sensing component, deconvolution processing may be performed based on both the information gathered from the motion sensing component In an embodiment, the deblurring is performed by the image capture device. In another embodiment usable in combination with other embodiments, the images are transferred to one or more other devices, which perform the deblurring. In yet another embodiment usable in combination with other embodiments, the one or more other devices may be a computing resource hosted by a computing resource provider. As another embodiment usable in combination with other embodiments, the information determined from analyzing bokeh artifacts with an initial aperture shape and bokeh artifacts with a changed aperture shape may be a product of processing one or more images by a device, and the information is provided to another device for deblurring processing.

Figure 11:
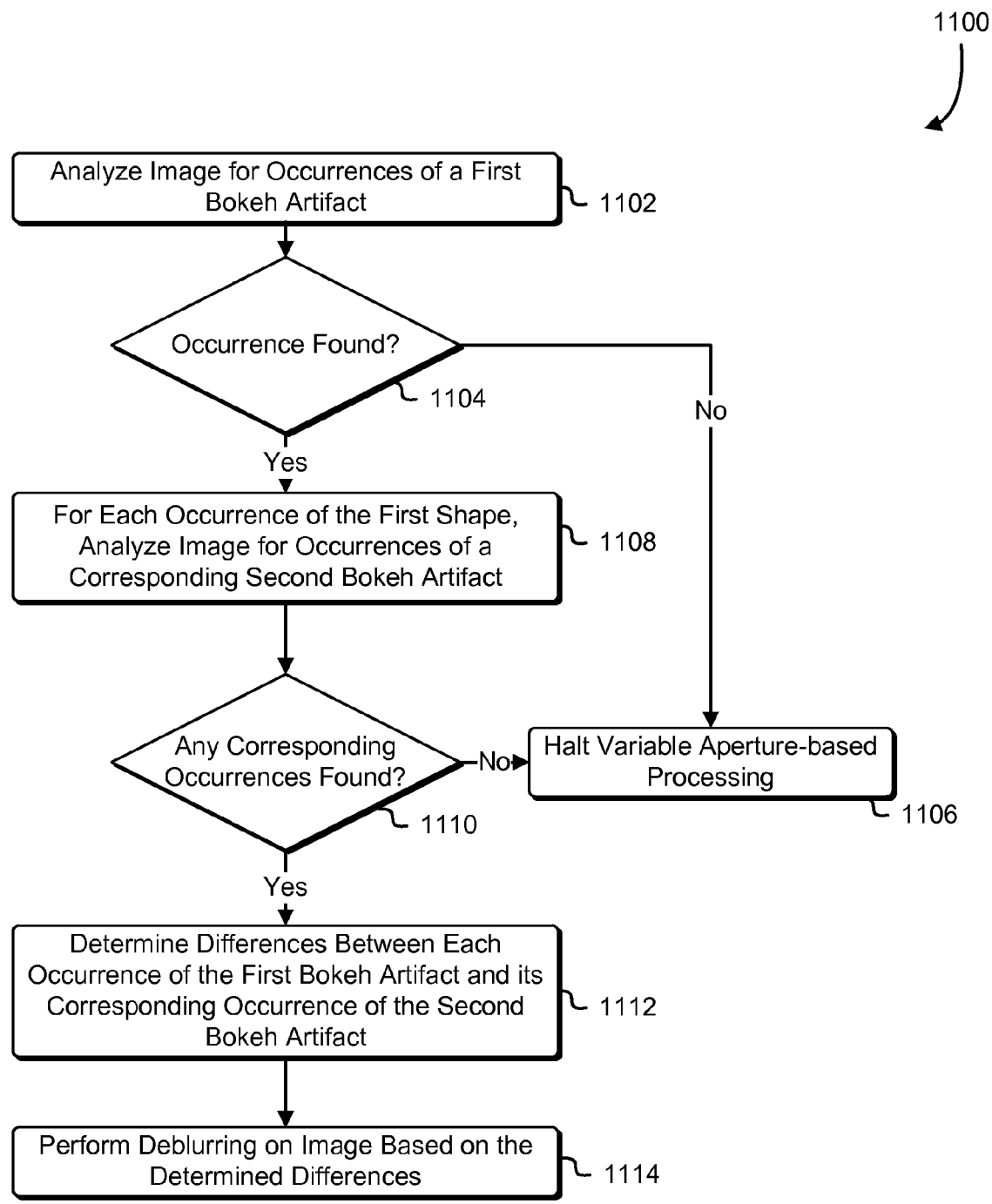
FIG. 11 is a flow chart that illustrates performing a deblurring operation in accordance with at least an embodiment.

FIG. 11 is a flow chart illustrating an example of a process 1100 for deblurring an image having bokeh artifacts in accordance with various embodiments. The process 1100 may be performed by any suitable image capture device, such as any of the user devices described in FIG. 1 or any external device 908 described in FIG. 9. The process 1100 includes a series of operations in which occurrences of bokeh artifacts captured during an image capture event are identified and analyzed. In 1102, an image may analyzed for one or more occurrences of bokeh artifacts in the shape of an initial aperture shape during the capture of the image; i.e., one or more first bokeh artifacts.

In 1104, if no occurrence of the first bokeh artifact has been detected, the device performing the process 1100 proceeds to 1106 and the variable aperture-based deblurring is halted. However, other deblurring operations may still be performed, including, but not limited to, blind deconvolution processing if no other information is known about the image and deblurring using information gathered from a motion detection component within the image capture device. On the other hand, if an occurrence of the first bokeh artifact has been detected, the device performing the process 1100 proceeds to 1108 and the image or one or more other images may be analyzed for occurrences of bokeh artifacts in the shape of a changed aperture shape corresponding to each detected occurrence of the first bokeh artifact. Note that when only one image is captured, the occurrences of the bokeh artifacts in the shape of the changed aperture may be located within the same image, whereas when multiple images are captured, the occurrences of the bokeh artifacts in the shape of the changed aperture may be located within one or more other images. Note also that occurrences of bokeh artifacts may be identified by the presence of one or more edges at least partially defining the initial aperture shape or the changed aperture shape.

If no occurrences of bokeh artifacts with the changed aperture shape corresponding to bokeh artifacts with the initial aperture shape are found, the device performing the process 1100 proceeds to 1106 and the variable aperture-based deblurring is halted. As noted, however, other deblurring operations may still be performed, including, but not limited to, blind deconvolution processing if no other information is known about the image and deblurring using information gathered from a motion detection component within the image capture device. On the other hand, if corresponding occurrences of bokeh artifacts with the changed aperture shape and bokeh artifacts with the initial aperture shape are found, the device performing the process 1100 proceeds to 1112. In 1112, differences between the corresponding bokeh artifacts are examined to gather information about the image, such as direction and angle of motion of the camera and objects in the scene, speed, location of objects in the scene, and location of objects relative to the image capture device during the period of time when the image was captured. Lastly, in 1114, deblurring may be performed on the image using deconvolution processing based on the information gathered from analyzing the differences between the corresponding bokeh artifacts to produce a sharp or sharper image than the original captured image.

In an embodiment, the aperture is changed mechanically. Examples of mechanically-changeable apertures include, but are not limited to apertures that may be mechanically rotated, apertures that may be mechanically widened or narrowed, and an aperture that mechanically flips. In another embodiment usable in combination with other embodiments, the aperture shape is defined by a combination of an opaque material in front of the lens and the blades of the shutter. In some instances, the blades of the shutter slide over each other in such a way as to create a shape with all internal angles of the same size (e.g., pentagonal, hexagonal, octagonal, circular, etc.). In other instances, the blades of the shutter slide in such a way as to create a shape in which all internal angles are not the same size (e.g., cross-shape, asymmetrical shape, etc.). In yet another embodiment usable in combination with other embodiments, the aperture is changed electrically. An example of an electrically-changeable aperture includes, but is not limited to, an aperture shape created by a liquid crystal display (LCD) in front of or behind the lens.

In an embodiment, the information determined by analyzing the differences between bokeh artifacts with the initial aperture shape and bokeh artifacts with the changed aperture shape may be used for tracking the motions of objects within the scene. In another embodiment usable in combination with other embodiments, the information determined by analyzing the differences between bokeh artifacts with the initial aperture shape and bokeh artifacts with the changed aperture shape may utilized to determine three-dimensional (e.g., depth, location, etc.) information about the scene.

Figure 12:
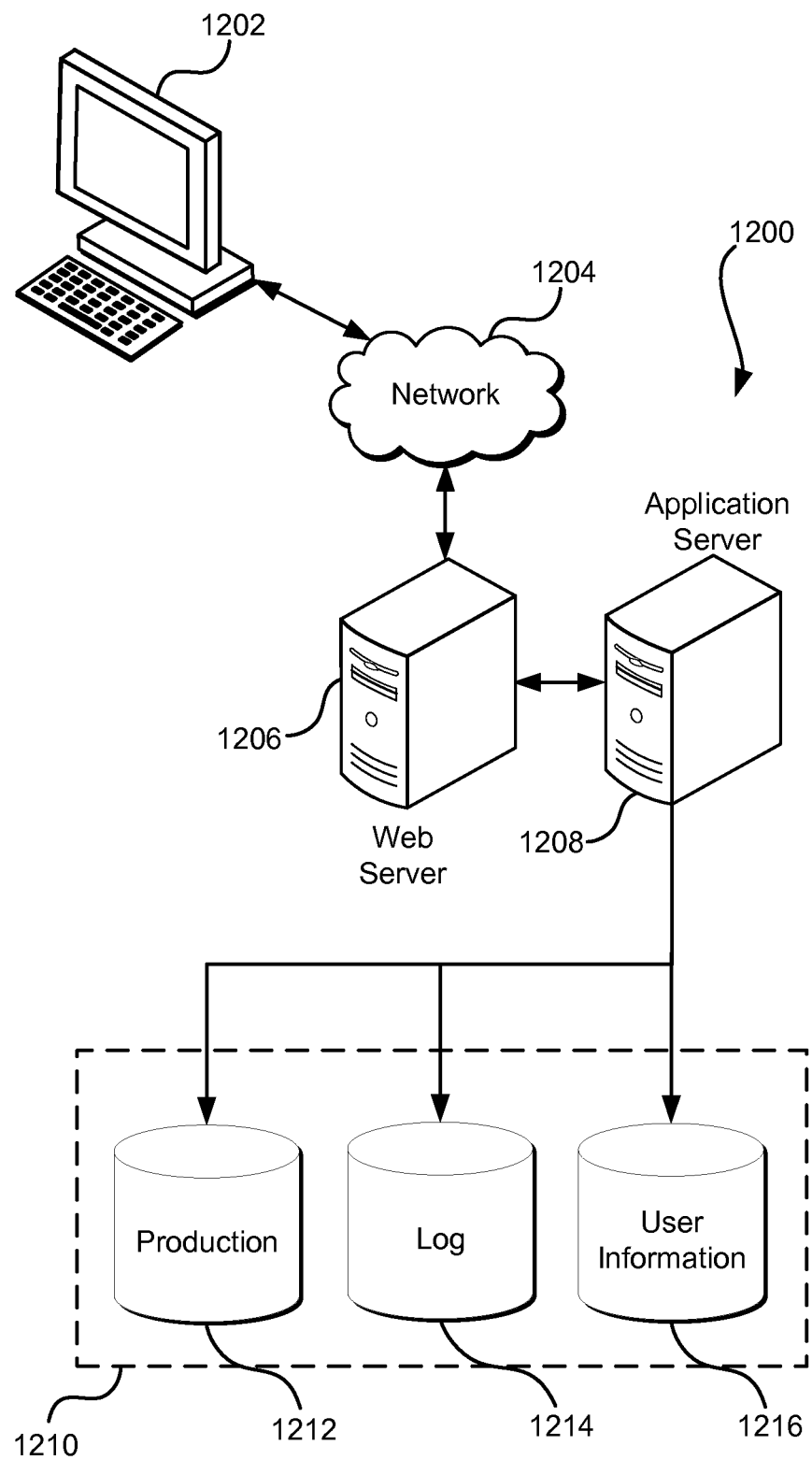
FIG. 12 illustrates an environment in which various embodiments can be implemented.

FIG. 12 illustrates aspects of an example environment 1200 for implementing aspects in accordance with various embodiments. As will be appreciated, although a web-based environment is used for purposes of explanation, different environments may be used, as appropriate, to implement various embodiments. The environment includes an electronic client device 1202, which can include any appropriate device operable to send and/or receive requests, messages or information over an appropriate network 1204 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed in detail. Communication over the network can be enabled by wired or wireless connections and combinations thereof. In this example, the network includes the Internet, as the environment includes a web server 1206 for receiving requests and serving content in response thereto, although for other networks an alternative device serving a similar purpose could be used as would be apparent to one of ordinary skill in the art.

The illustrative environment includes an application server 1208 and a data store 1210. It should be understood that there can be several application servers, layers or other elements, processes or components, which may be chained or otherwise configured, which can interact to perform tasks such as obtaining data from an appropriate data store. Servers may be implemented in various ways, such as hardware devices or virtual computer systems. In some contexts, servers may refer to a programming module being executed on a computer system. Unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1202 and the application server 1208, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed can be executed on any appropriate device or host machine as discussed elsewhere. Further, operations described as being performed by a single device may, unless otherwise clear from context, be performed collectively by multiple devices, which may form a distributed and/or virtual system.

The data store 1210 can include several separate data tables, databases, data documents, dynamic data storage schemes and/or other data storage mechanisms and media for storing data relating to a particular aspect of the present disclosure. For example, the data store illustrated may include mechanisms for storing production data 1212 and user information 1216, which can be used to serve content for the production side. The data store also is shown to include a mechanism for storing log data 1214, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. The application server 1208 may provide static, dynamic or a combination of static and dynamic data in response to the received instructions. Dynamic data, such as data used in web logs (blogs), shopping applications, news services and other such applications may be generated by server-side structured languages as described or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1202. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure.

The environment, in an embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize a network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within a working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references cited, including publications, patent applications and patents, are hereby incorporated by reference to the same extent as if each reference were individually and specifically indicated to be incorporated by reference and were set forth in its entirety.

What is claimed is:

1. A method for producing a deblurred image, comprising:
   under the control of one or more devices configured with executable instructions,
   obtaining one or more images corresponding to an image capture event;
   detecting, within the one or more images, a first bokeh artifact having a first shape resulting from an aperture in a first state, and a second bokeh artifact having a second shape resulting from the aperture in a second state, the aperture in the second state being different from the aperture in the first state;
   determining, based at least in part on the detected first and second shapes, movement of an object of the image capture event relative to the one or more capture devices; and
   generating an image by processing the one or more images based on the determined movement.

2. The method of claim 1, wherein the first state differs from the second state by rotation, form, or size.

3. The method of claim 1, wherein the first state changes to the second state smoothly in a continuous transition.

4. The method of claim 1, wherein
   the first shape corresponding to the aperture in the first state occurs within a first image of the one or more images;
   the second shape occurs within a second image of the one or more images; and
   determining the movement is further based at least in part on the first shape.

5. The method of claim 1, wherein the second shape is detected within the same image as the first shape.

6. An image capture device, comprising:
   an aperture;
   an image recording mechanism;
   one or more processors; and
   memory including instructions that, as a result of execution by the one or more processors, cause the image capture device to:
   perform an image capture process during which light passes through the aperture to the image recording mechanism;
   during the image capture process, change the aperture from a first state to a second state;

record a result of the image capture process in the memory; and generate an image by processing artifacts in the recorded result created by the first and second aperture states.

7. The image capture device of claim 6, wherein the image capture device further comprises:
a second aperture; and
a second image recording mechanism configured to receive light passing through the second aperture during the image capture process.

8. The image capture device of claim 6, wherein
a first image is captured during the image capture process; and
the aperture changes state during capture of the first image.

9. The image capture device of claim 6, wherein
a plurality of images are successively recorded during the image capture process; and
the aperture changes state between the recording of each of the plurality of images.

10. The image capture device of claim 6, wherein the aperture changes state by changing a shape of the aperture during the image capture process.

11. The image capture device of claim 6, wherein the aperture changes state by at least rotating the aperture during the image capture process.

12. The image capture device of claim 6, wherein the aperture changes state by at least varying a size of the aperture during the image capture process.

13. The image capture device of claim 6, wherein the aperture changes state a plurality of times during the image capture process.

14. The image capture device of claim 6, wherein change of the aperture from the first state to the second state is performed by a mechanical shutter component.

15. The image capture device of claim 6, wherein change of the aperture from the first state to the second state is performed by a liquid crystal component.

16. A non-transitory computer-readable storage medium having collectively stored thereon executable instructions that, as a result of execution by one or more processors of a computer system, cause the computer system to at least:
obtain one or more images;
detect, within the one or more images, a first bokeh artifact corresponding to a subject of the one or more images and to a first position of the subject of the one or more images and a second bokeh artifact corresponding to the subject of the one or more images and to a second position of the subject of the one or more images, the first bokeh artifact resulting from an aperture in a first state and the second bokeh artifact resulting from the aperture in a second state; and
modify at least one of the one or more images by deconvolution based at least on a difference between the detected first and second bokeh artifacts.

17. The non-transitory computer-readable storage medium of claim 16, wherein the instructions that cause the computer system to process at least one or more images further include instructions that cause the computer system to at least deblur the at least one of the one or more images based at least in part on a magnitude of the difference between the first and second bokeh artifacts.

18. The non-transitory computer-readable storage medium of claim 16, wherein the instructions further comprise instructions that cause the computer system to deblur the at least one of the one or more images based on at least information obtained from a motion sensing component within an image capture device.

19. The non-transitory computer-readable storage medium of claim 16, wherein:
the first bokeh artifact corresponds to the subject detected within one or more polychromatic images; and
the instructions further include instructions that cause the computer system to detect the second bokeh artifact corresponding to the subject detected within one or more monochromatic images; and
the at least one of the one or more images are processed based at least in part on a displacement between the first bokeh artifact and the second bokeh artifact.

20. The non-transitory computer-readable storage medium of claim 16, wherein the instructions that cause the computer system to process at least one or more images further include instructions that cause the computer system to at least determine a depth of at least one object within the one or more images based at least on the first and second bokeh artifacts.

21. The non-transitory computer-readable storage medium of claim 16, wherein the instructions that cause the computer system to obtain the one or more images cause the computer system to obtain the one or more images from an image capture device that captured the one or more images.

* * * * *